United States Patent [19]

Marks

[11] Patent Number: 4,926,474
[45] Date of Patent: May 15, 1990

[54] ERGONOMIC TELEPHONE HANDSET

[76] Inventor: Peter J. Marks, 107 Park Street, South Melbourne, Victoria, Australia, 3205

[21] Appl. No.: 165,268
[22] PCT Filed: Jun. 5, 1987
[86] PCT No.: PCT/AU87/00161
   § 371 Date: Jan. 25, 1988
   § 102(e) Date: Jan. 25, 1988
[87] PCT Pub. No.: WO87/07798
   PCT Pub. Date: Dec. 17, 1987

[30] Foreign Application Priority Data

Jun. 5, 1986 [AU] Australia .............. PH06302

[51] Int. Cl.$^5$ .............................. H04M 1/03
[52] U.S. Cl. .................................. 379/433
[58] Field of Search ............. 379/433, 434, 419;
             D14/53, 63, 64, 65, 67, 248, 249

[56] References Cited

U.S. PATENT DOCUMENTS

| | | | |
|---|---|---|---|
| D. 279,273 | 7/1985 | Rivette et al. | 379/434 |
| D. 284,761 | 7/1986 | Ryan | D14/64 |
| D. 284,858 | 7/1986 | Kao | D14/63 |
| D. 293,238 | 12/1987 | Elie | D14/63 |
| 529,174 | 11/1894 | Higgins | 379/433 |
| 679,405 | 7/1901 | Volkers | 379/433 |
| 855,394 | 5/1907 | Falk | 379/433 |
| 1,216,480 | 2/1917 | Nichols | 379/434 |
| 1,899,046 | 2/1933 | Nichols | 379/431 |
| 2,456,346 | 12/1948 | Veneklasen | 379/433 |
| 2,720,332 | 10/1955 | Holt | 379/433 |
| 4,228,325 | 10/1980 | Blomberg | 379/434 |
| 4,675,903 | 6/1987 | Gulezian et al. | 379/433 |

FOREIGN PATENT DOCUMENTS

| | | |
|---|---|---|
| 575917 | 8/1988 | Australia . |
| 167108 | 1/1986 | European Pat. Off. . |
| 870090 | 1/1958 | United Kingdom . |
| 1185777 | 3/1970 | United Kingdom ............... 379/433 |
| 1526491 | 9/1978 | United Kingdom . |
| 2158328A | 11/1985 | United Kingdom . |

OTHER PUBLICATIONS

*Telephony*, Jul. 16, 1979.

Primary Examiner—Jin F. Ng
Assistant Examiner—Danita R. Byrd
Attorney, Agent, or Firm—Learman & McCulloch

[57] ABSTRACT

An ergonomic telephone handset having a handle terminating at one end in a speaker portion and at its opposite end in a microphone portion, the handle being bent between its ends in J, V, or zig-zag form. The speaker portion is inclined to the handle at an angle corresponding substantially to that at which the ear of the user is inclined to his skull and the handle supports an abutment which rests upon the user's cheek to assist in locating the handset in a position in which the user's head and arm are in low stress positions during use of the handset.

9 Claims, 8 Drawing Sheets

ERGONOMIC TELEPHONE HANDSET

The present invention relates to an ergonomic telephone and particularly to the handset of the telephone.

BACKGROUND OF THE INVENTION

Conventional handsets were conceived at a time when design criteria focused essentially upon placing the speaker and microphone of the telephone on a single handset. Little or no emphasis was placed on the location of the grip portion of the handset, or the manner in which a handset would need to be gripped in normal usage of the handset.

This has resulted in handsets requiring hand, wrist and arm positions that are not relaxed and therefore placing undue stress on joints and muscles. The normal use of conventional handsets requires the positioning of the user's hand in the area between his/her ear and mouth. This raises the arm to a significant extent and therefore activates most of the arm and shoulder muscles during normal use of the handset, leading to the onset of tiredness over a period of use which in turn leads to a falling away of the handset from its optimum functioning position.

The position of the arm and hand above described must be maintained during the length of the telephone conversation so that the speaker and microphone of the handset can be firmly held against the ear and near the mouth respectively. Whenever the position of the arm and hand is relaxed or the pressure reduced from a firm holding of a handset against the head of the user, the mouthpiece thereof tends to drop below the chin of the user leading to muted conversation. A constant conscious effort must therefore be maintained to keep the required alignment of the mouth and earpieces of the telephone.

A telephone handset has been published in Australian Patent Application No. 39445/85, which is claimed to be of ergonomic design, however, the handset disclosed therein follows conventional theory in still requiring the gripping of the handset between the ear and mouth of the user or in the vicinity adjacent the mouth of the user. Thus the abovementioned problems still exist.

SUMMARY OF THE INVENTION

Towards overcoming the above problems therefore, and placing the arm and hand in a more relaxed position whilst using a telephone, there is provided a telephone handset comprising a speaker portion, microphone portion and handle connecting said portions, wherein said handle is provided with a grip portion which in use is displaced below and remote from the mouth of the user.

There is also provided a telephone handset comprising a speaker portion and a microphone portion adapted for connection to a telecommunications system to allow a telephone conversation wherein the handset comprises a handle portion which in use is positioned at a level below and spaced from the microphone and mouth of the user so that the arm and hand of the person holding the handle portion in use is located at a position of less stress.

According to one preferred embodiment of the invention, the handle of the telephone handset is in longitudinal cross-section in the shape of a J or V, with the handle portion below the level of the microphone portion. The angle between the arms of the handle is preferably 40° or more, and according to the specific embodiment to be described further hereunder between 48° and 52°. The angle is dependent somewhat on the length of the major arm of the handle and the minimum direct line distance between the speaker portion and microphone portion for comfortable alignment with the ear and mouth of a user. The major arm of the handle is that part of the handle extending from the speaker portion to the end of the grip portion.

Preferably, the major arm of the handle will be elongated so that the grip portion places the hand at or about chest level of the user, so that the lower arm and about chest level of the wrist can, if desired, rest on the chest whilst holding the telephone handset. It is considered that the lower attitude of the hand places the upper part of the arm in a more neutral position alongside the body and minimizes dropping or twisting of the wrist and consequently dropping of the mouthpiece away from the mouth which occurs when using conventional telephone handsets.

In a further preferred form of the invention the telephone handset includes a body of substantially zig-zag configuration in which the speaker position is located at one end and the microphone portion is positioned intermediate to the ends of the handset, the handle for the handset being positioned at the end remote from the speaker portion.

The microphone may in this form be a directional microphone located adjacent to the number dialling means. The microphone may incorporate a filter to block background noise and transmit the voice of the user only.

By utilising the telephone handset according to the invention, the arm, wrist and hand are placed in a position about the chest of the user which alleviates the inherent tendency or necessity to drop the arm or hand during long telephone conversations.

According to a further aspect of the invention there is provided a modified speaker portion wherein the speaker portion is shaped to fit around and substantially envelope the ear. The speaker housing portion can be pressed against the skull of the user minimising the effort required to keep the handset in place. The enveloping of the ear has the further advantage of assisting hearing of the telephone conversation by reducing perception of other sound coming from the vicinity of the user.

According to another aspect of the invention, the handset is configured to include an abutment adjacent to the speaker, said abutment being adapted to rest against the cheek bone or face of the user. The speaker portion is, in this embodiment, angled away from the head of the user to follow the natural line of the ear.

In yet another preferred form of the invention, the dialling mechanism can be placed on the reverse side of the telephone or alternatively on a console unit.

The dialling mechanism may incorporate an LED display for the number dialed and other technological functions.

A rotating grip portion may be provided on the handle so that in use the most comfortable and relaxed position of the wrist of the user can be obtained.

A specific embodiment of the invention will be

THE DRAWINGS

A specific embodiment of the invention will be described with reference to the accompanying figures as follows.

DETAILED DESCRIPTION

Referring to the figures, the speak portion 1 and microphone portion 2 are connected by a handle 3 of substantially J or V configuration. A grip portion 4 is provided along the handle for holding of the telephone in use.

It can be seen from the figures that the speaker portion is provided with moulding 5 creating a depression 6 into which the ear of the user will fit comfortably with the moulding resting against the skull of the user.

Figure 3:
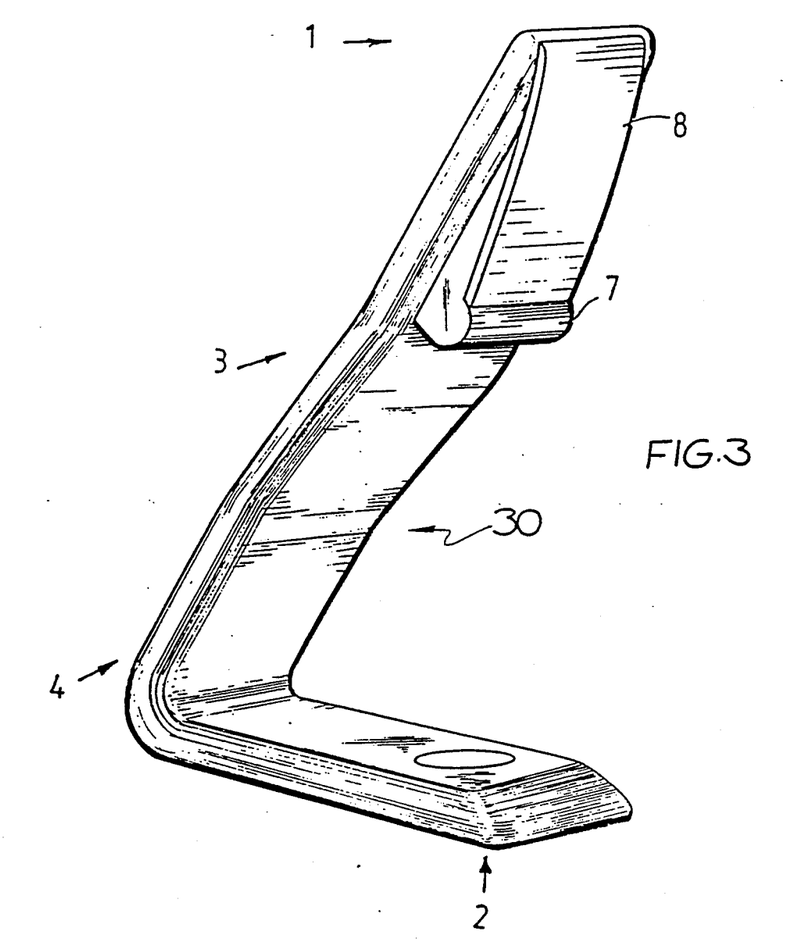
FIG. 3 front perspective view of telephone according to a further embodiment.

Referring to FIG. 3, and the further embodiment of the telephone, the speaker portion 1 is provided with an abutment 7 adapted to rest against the cheek bone of the user and from which the remainder of the speaker portion 8 is angled away from the cheek portion. In use, that part of the speaker portion designated 8 is angled away from the head of the user to accommodate the ear comfortably. Preferably, the surface of the speaker portion in contact with the ear can be made from a soft plastic or foam for comfort.

Figure 1:
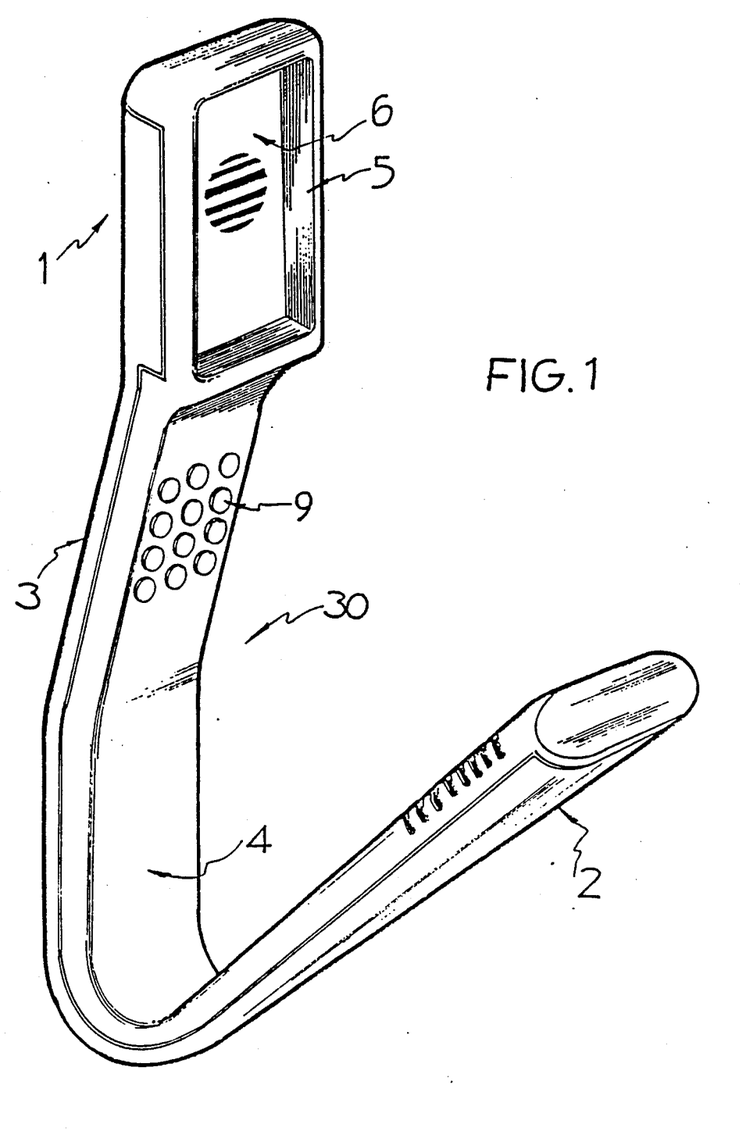
FIG. 1 front perspective of the telephone.

The dialling mechanism 9 of the telephone is preferably as shown in FIG. 1, however it can also be placed on the reverse side of the handle 3 or between the grip portion 4 and microphone portion 2, again on either side of the handle.

Figure 4:
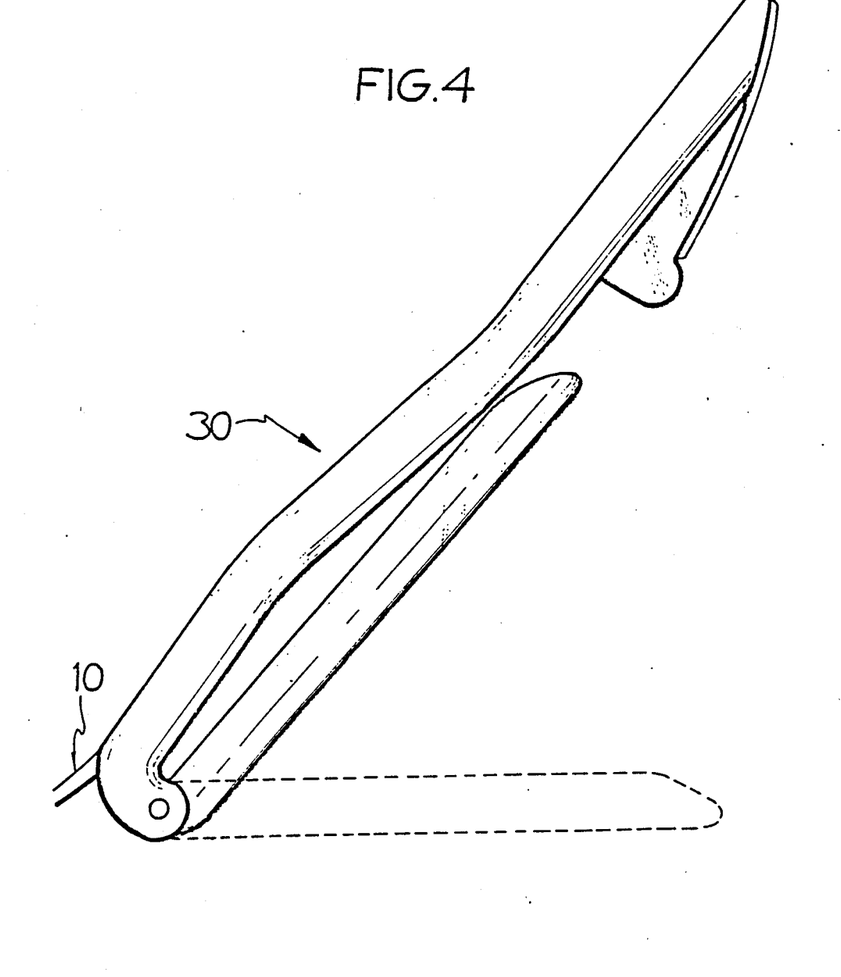
FIG. 4 side view of telephone according to yet a further embodiment.

Referring to FIG. 4, there is shown yet another embodiment of the invention. In this embodiment, the handle of the telephone is hinged, and preferably spring loaded so that it can rest substantially flat when not in use.

Figure 2:
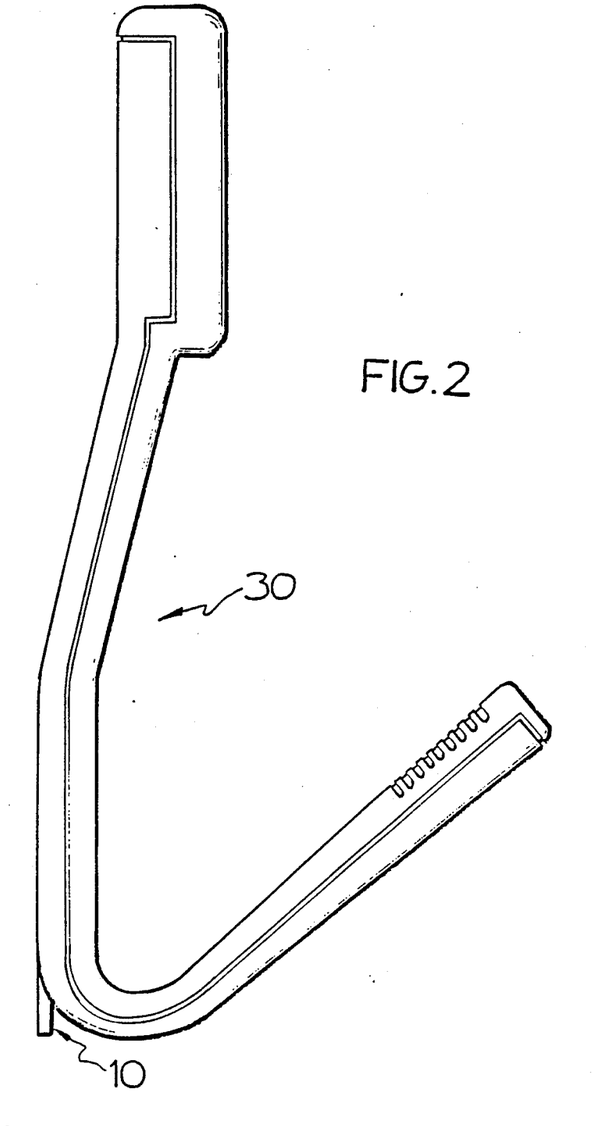
FIG. 2 side view of the telephone.

Not shown in the figures is a connect/disconnect button which can be placed anywhere on the telephone and preferably on the handle between the grip portion and microphone portion on the underside thereof. When the telephone is picked up, the said button will connect in readiness for dialling. The positioning of the cord 10 on the telephone is preferably as shown in FIGS. 2 and 4 to minimize drag and further reduce the energy required to use the telephone.

In use, the telephone is gripped at or about the grip portion and the hand is able to rest against the chest of the user. The arm of the user will be in substantially the same line as the major arm of the telephone and resting against the side of the user's body.

Figure 5:
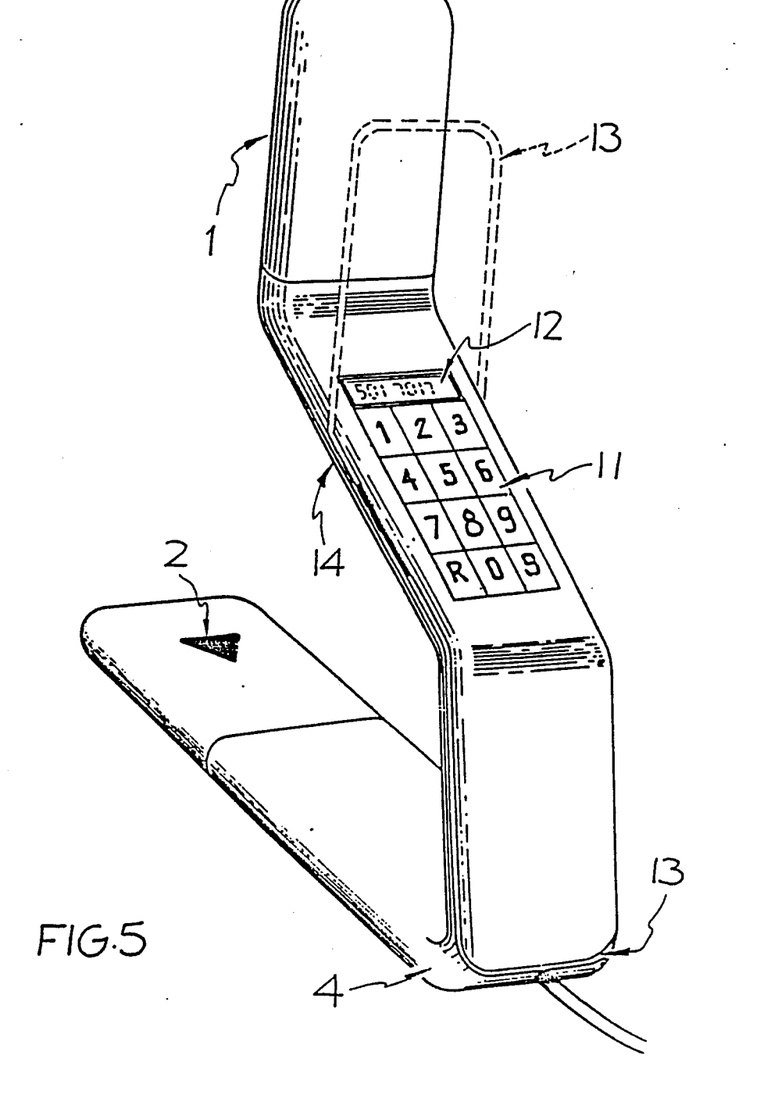
FIG. 5 is a further embodiment of the handset viewed from the rear.
Figures 6, 7:
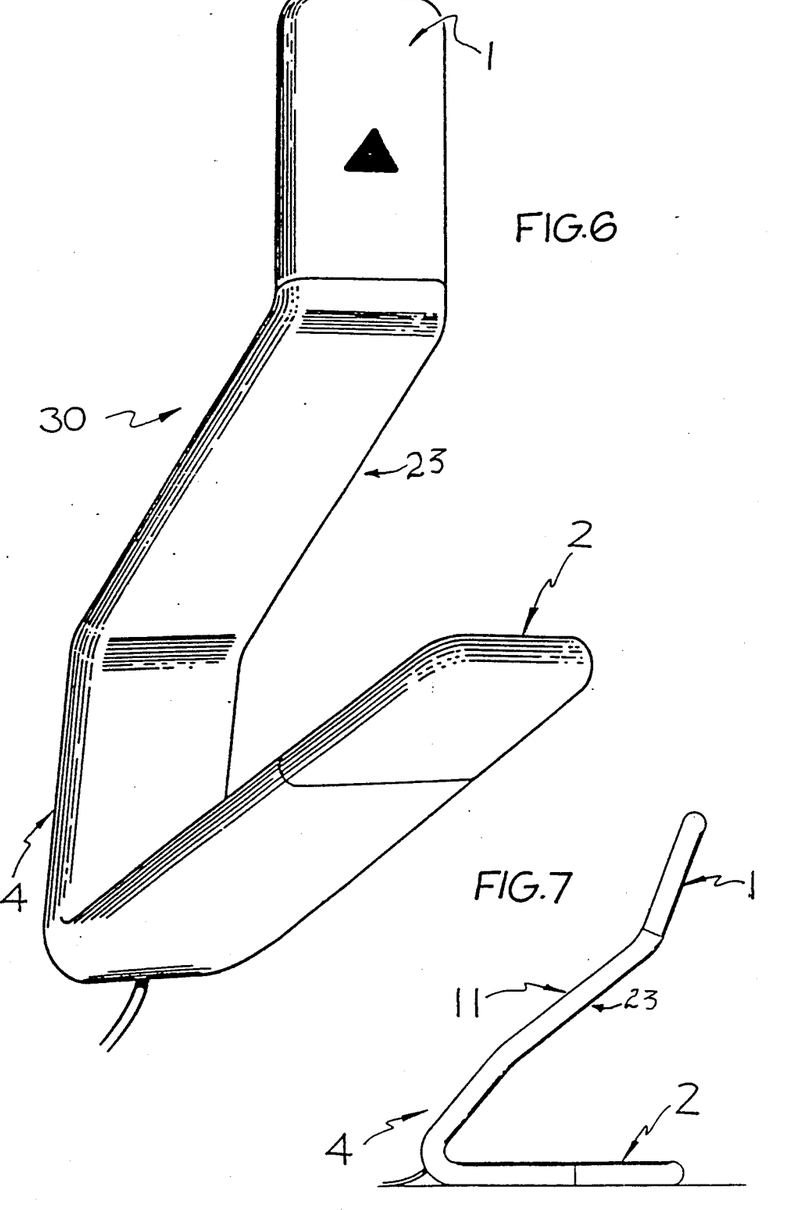
FIGS. 6 and 7 are frontal and side views of the handset.

Referring to FIGS. 5 to 7, there is shown a handpiece including a dialling mechanism 11 on the rear face of the handpiece. The dialling mechanism may include an LED display 12 to give a visible confirmation of the number called or any other technological functions.

A shoulder rest clip 13 is rotatably mounted on the body at 14 to allow pivoting to the position shown in phantom outline. The clip rests flush with the body when not in use. The clip is a loop or partial loop of stiff wire spring mounted on the body. The body portion 4 may be hinged in the manner shown in FIG. 4 as desired.

Figures 8, 8A, 9:
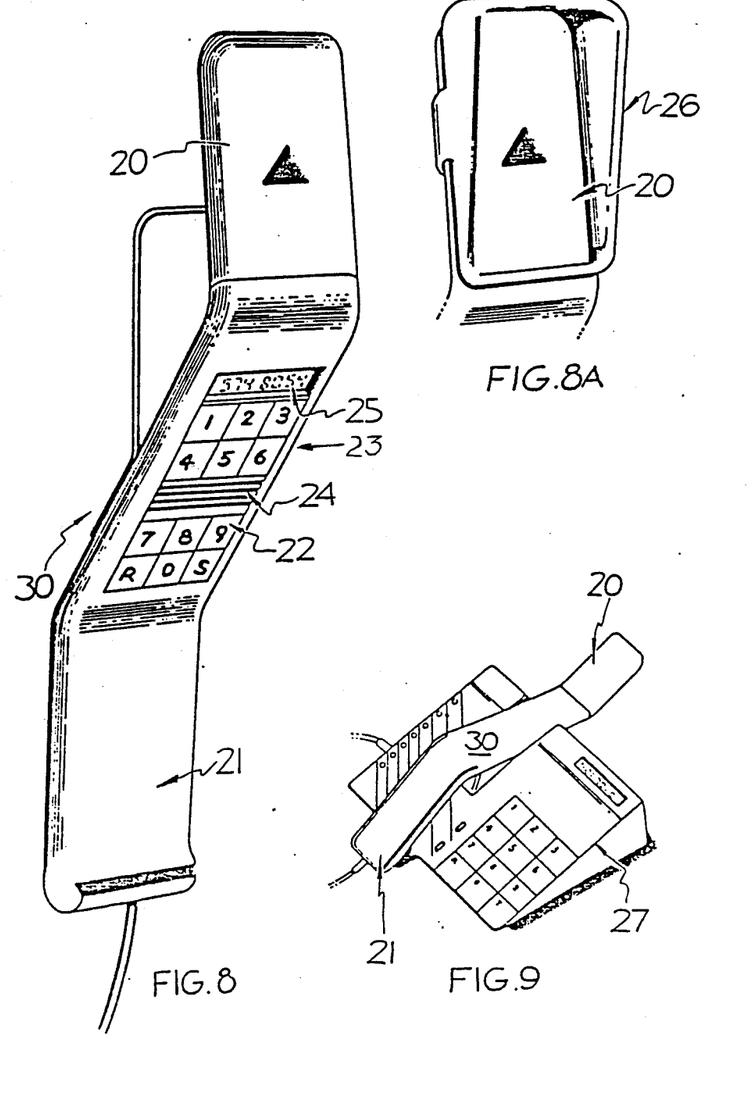
FIG. 8 is a frontal view of a further embodiment of a handset.
FIG. 8A shows a modified earpiece construction.
FIG. 9 shows a handset and conventional telephone.

With reference to FIGS. 8, 8A and 9, there is shown a modified handpiece of zig-zag configuration with the speaker portion 20 at the top and a handle portion 21 at the bottom. In the FIG. 8 version the dialling mechanism 22 is located on the intermediate portion 23 as is the microphone 24. A number display 25 is also provided.

The speaker portion has a clip-on housing 26, as shown in FIG. 8A, which ensures that in use the housing makes contact with the skull of the user and encloses the ear thus minimising perception of external sound.

FIG. 9 shows the handpiece in a more conventional arrangement mounted on a telephone body 27.

Figure 10A:
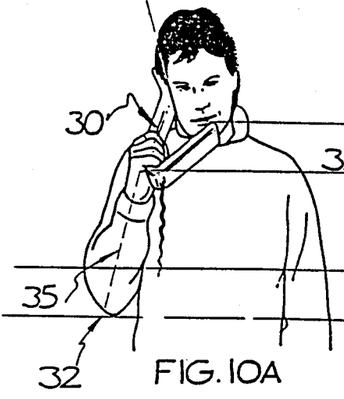
FIGS. 10A, 10B and 10C show the ergonomic features of the handset.
Figure 10B:
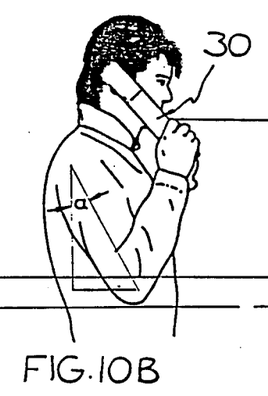
Figure 10C:
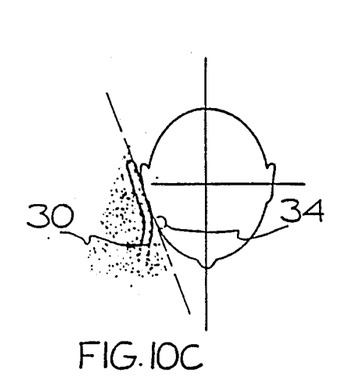

FIGS. 10A, B and C show in semi-schematic fashion usage of the handpiece 30 of the invention where the handpiece is gripped below the mouth as a direct comparison to usage of a conventional handpiece 31 where the handpiece is gripped between the ear and mouth.

Referring first to FIGS. 10A, B and C, the point of the elbow is positioned in a lower position 32 close to the optimum comfort position. The angle a of the upper arm extended from the vertical is kept to a minimum and, finally, with reference to FIG. 10C, the earpiece is formed to contact the upper cheek bone at point so that the earpiece extends away from the rear of the ear rather than resting against the rear of the ear at 34a in the conventional earpiece.

The line 35 in FIG. 10A is at a small angle to the vertical so that the arm is at or close to its natural position at the side of the body. Finally, the hand is lifted only to line 36 as shown in FIGS. 10A and 10B.

Figure 11A:
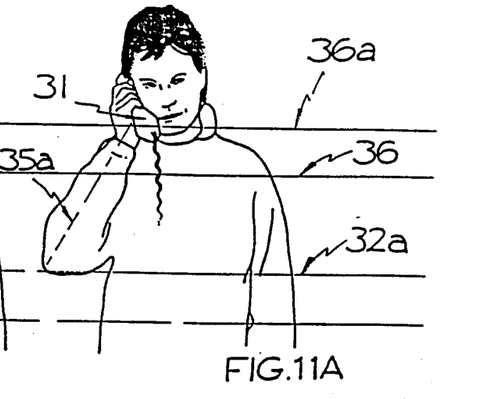
FIGS. 11A, 11B, and 11C show the use of a conventional handset.
Figure 11B:
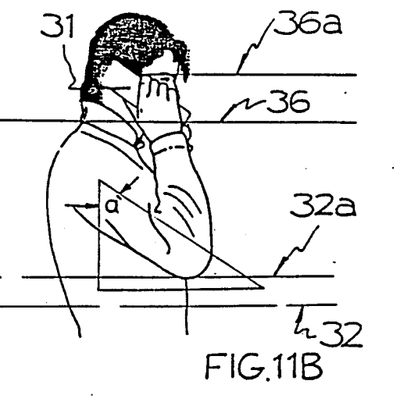
Figure 11C:
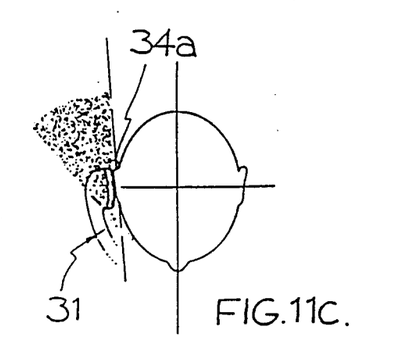

With reference to FIGS. 11A, B and C, the arm position 32a and hand position 36a is higher to ensure proper handling of the conventional handpiece. Furthermore, the angle a is larger thus increasing the leverage effect on the arm and stressing the arm muscles. The dimension between 32 and 32a increases leverage and the dimension between 36 and 36a means the arm must be extended from the side of the person as indicated by line 35a.

The claims defining the invention are as follows I claim:

1. A telephone handset adapted for connection to a telecommunication system to allow a telephone conversation to be carried on by a user of the handset, said handset comprising a handle terminating at one end in a speaker portion and at its opposite end in a microphone portion spaced from said speaker portion, said handle being bent between its ends to enable said speaker portion to confront the ear of the user and the microphone portion to confront the mouth of the user, said speaker portion having a face adapted to confront an ear of the user, abutment means carried by said handle adjacent said speaker portion in a position to rest against the cheek of the user, said speaker portion being inclined to said handle at an angle such that when said face of said speaker portion engages the ear of the user and said handle extends alongside the cheek of the user said face is angled away from the skull of the user at substantially the angle of the ear to the skull.

2. The telephone handset according to claim 1 including a molding carried by said speaker portion for susbtantially enveloping the ear of the user.

3. The telephone handset according to claim 1 in which said speaker portion, said microphone portion, and said handle together form a body substantially J-shaped in longitudinal cross section.

4. The telephone handset according to claim 1 in which said speaker portion, said microphone portion, and said handle together form a body substantially V-shaped in longitudinal cross section.

5. The telephone handset according to claim 1 in which said speaker portion, said microphone portion, and said handle together form a body substantially zig-zag-shaped in longitudinal cross section.

6. The telephone handset according to claim 1 wherein said speaker portion is formed from yieldable, deformable material.

7. The telephone handset according to claim 6 wherein said material is a plastic.

8. The telephone handset according to claim 6 wherein said material is foam.

9. The telephone handset according to claim 1 wherein said handle is hinged between said portions.

* * * * *

UNITED STATES PATENT AND TRADEMARK OFFICE
CERTIFICATE OF CORRECTION

PATENT NO. : 4,926,474
DATED : May 15, 1990
INVENTOR(S) : Peter J. Marks

It is certified that error appears in the above-identified patent and that said Letters Patent is hereby corrected as shown below:

Column 2, line 12, cancel "about chest level of the".

Column 2, line 62, cancel "A specific embodiment of the invention will be".

Column 3, line 20, change "speak" to -- speaker --.

Column 4, line 32, after "that" insert -- the shaded wedge portion 34 points upwardly so that --.

Column 4, line 49, cancel "I claim".

Column 5, bridging lines 2 and 3, change "susbtantially" to -- substantially --.

Signed and Sealed this

Sixth Day of August, 1991

Attest:

HARRY F. MANBECK, JR.

Attesting Officer

Commissioner of Patents and Trademarks